Nov. 22, 1938.　　　T. J. TUREK　　　2,137,959
GEAR SHIFTING MECHANISM
Filed Jan. 3, 1936　　　3 Sheets-Sheet 1

Inventor
Thomas J. Turek
N. D. Parker Jr.
Attorney

Nov. 22, 1938.  T. J. TUREK  2,137,959
GEAR SHIFTING MECHANISM
Filed Jan. 3, 1936  3 Sheets-Sheet 2
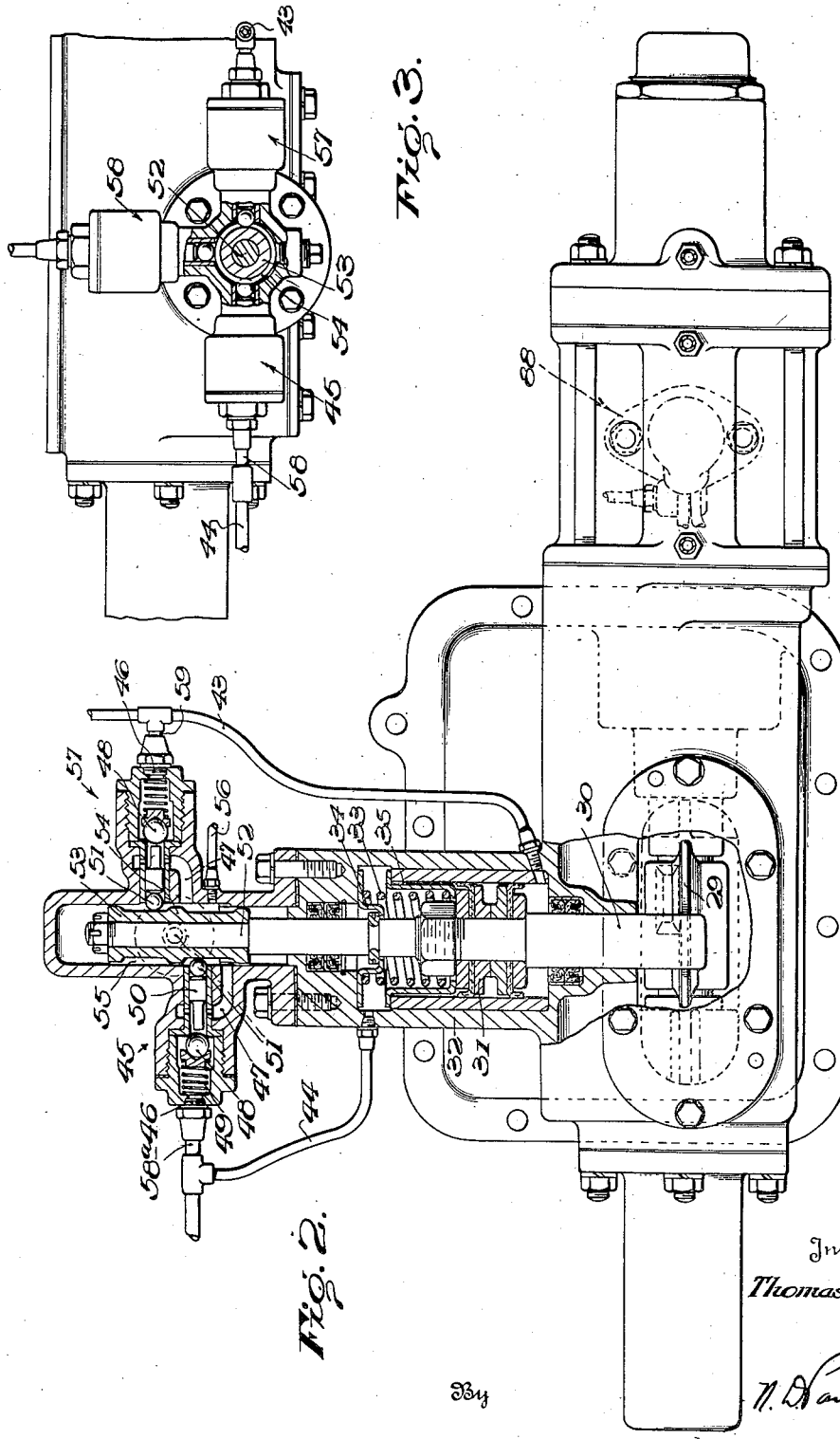
Inventor
Thomas J. Turek Nov. 22, 1938.  T. J. TUREK  2,137,959

GEAR SHIFTING MECHANISM

Filed Jan. 3, 1936  3 Sheets-Sheet 3

Inventor

Thomas J. Turek

By N. D. Lawson Jr.

Attorney

Patented Nov. 22, 1938

2,137,959

UNITED STATES PATENT OFFICE 2,137,959

GEAR SHIFTING MECHANISM

Thomas J. Turek, Pittsburgh, Pa., assignor to Bendix-Westinghouse Automotive Air Brake Company, Pittsburgh, Pa., a corporation of Delaware Application January 3, 1936, Serial No. 57,412

12 Claims. (Cl. 192—3.5)

This invention relates to vehicle control mechanism and more particularly to a mechanism for controlling the selection and establishment of various gear relations of a transmission gearing and for coordinately operating a vehicle clutch.

One of the objects of the present invention is to provide, in a power-operated vehicle transmission gearing, a novel construction whereby the vehicle clutch is automatically disengaged prior to the establishment of the desired gear relation, and thereafter permitted to engage in a smooth and gradual manner.

Another object is to provide, in a construction of the above character and employing a power device for shifting a member to establish a desired gear relation, a novel arrangement for automatically operating the vehicle clutch in accordance with the shifting movement of the power device.

Still another object is to provide a novel arrangement of fluid pressure-operated means for selecting and establishing a desired gear ratio in combination with fluid pressure-operated vehicle clutch-controlling mechanism, the latter being operatively coordinated with the former and directly controlled thereby.

A further object is to provide, in a mechanism of the above type, a novel shifter power unit having relatively movable members operable when the unit is initially energized for a gear-shifting operation, to automatically effect a disengagement of the vehicle clutch.

A still further object is to construct the shifting power unit in such a manner that the various component parts thereof may be readily assembled and adjusted, with a minimum amount of effort, to the proper position for operation.

A further object is to provide a compact and rugged installation of the above type, capable of economical manufacture and readily adaptable to existing types of transmission mechanisms.

Other objects and novel features of the invention will appear more fully hereinafter from the following detailed description when taken in connection with the accompanying drawings. It is to be expressly understood, however, that the drawings are employed for purposes of illustration only and are not designed as a definition of the limits of the invention, reference being had for this purpose to the appended claims.

In the drawings, wherein similar reference characters refer to similar parts throughout the several views:

Fig. 2 is a plan view of the transmission control mechanism, a portion of the selector power unit being shown in section;

Fig. 3 is an end view of a portion of the power-controlling mechanism, the valve-actuating structure being shown in section;

Figure 1:
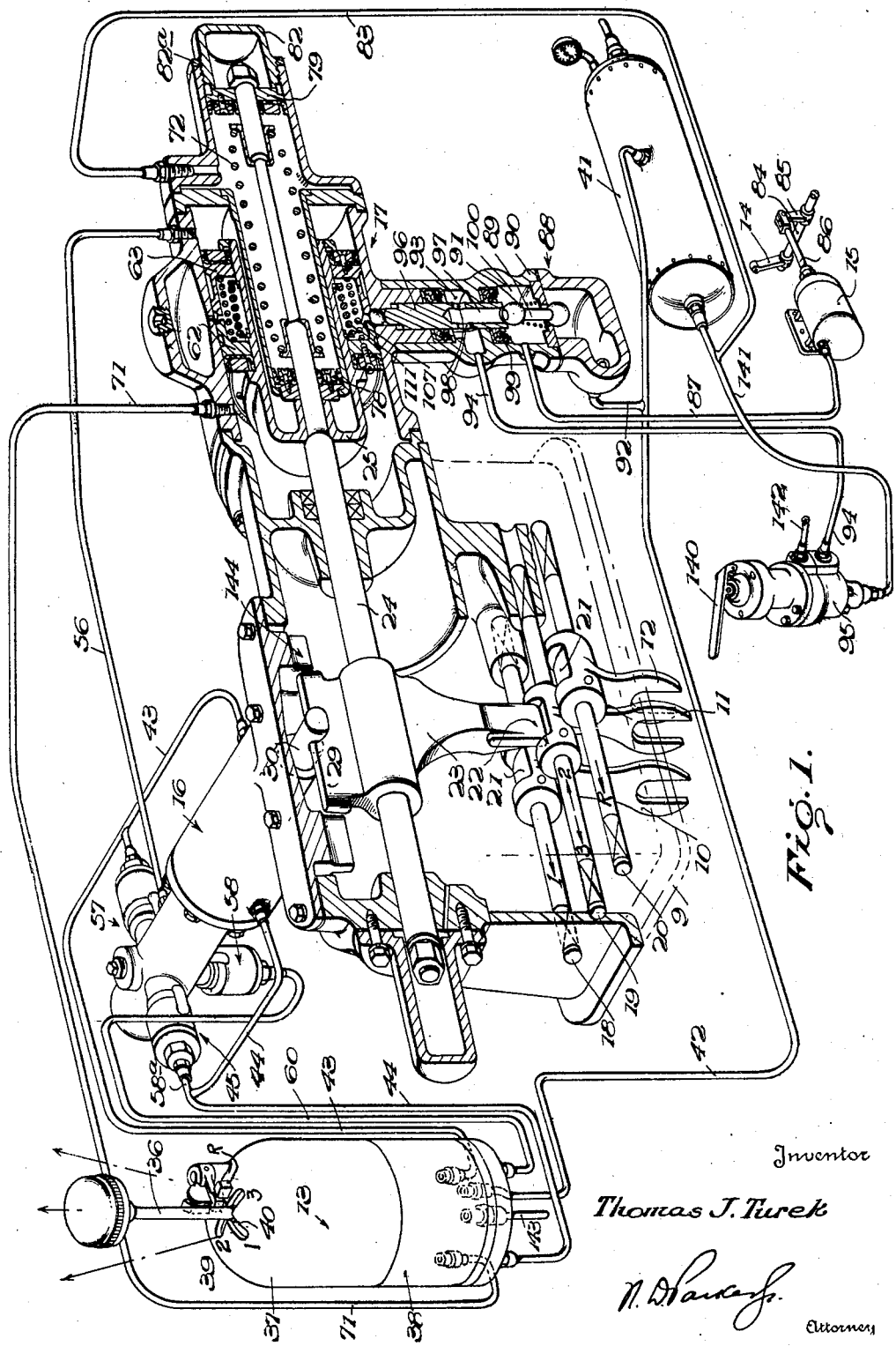
Fig. 1 is a diagrammatic view of the present invention, illustrated in perspective, certain of the parts being shown in section.

Referring more particularly to Fig. 1, a transmission control mechanism constructed in accordance with the present invention is illustrated therein as being associated with a vehicle transmission gearing 9 of any well known type and including shifter forks 10, 11 and 12 engaged with the transmission gears or clutches, not shown, and shiftable in the usual manner to establish a desired gear relation. In the present instance, a selection and establishment of the desired gear relation or ratio is effected through a power-operated mechanism remotely controlled through an operator-controlled unit 13, there being also provided a vehicle clutch-controlling element 14 and a fluid pressure-controlled actuator 15 therefor which is incorporated in the transmission control system in a manner which will appear more fully hereinafter.

For the purpose of remotely effecting a selection and establishment of a desired gear relation, under the control of unit 13, the present invention provides a selecting fluid pressure actuator 16 and a shifting fluid pressure actuator 17 which are associated with the usual shifter bars 18, 19 and 20 of the vehicle transmission 9. As shown, these bars carry the shifter forks 10, 11 and 12 which are provided with the customary slotted portions 21, adapted to be selectively engaged by the lower end portion 22 of a combined selector finger or member 23, the latter being mounted on a piston rod 24 of a piston 25, in such a manner as to be rotatable with respect to said rod but shiftable therewith. The finger 23 is provided with an elongated flanged extension 29 having a suitable connection with a piston rod 30 carried by a piston 31, the last named piston being associated with the selector actuator 16 while the piston 25 is associated with the shifting actuator 17.

The actuator 16 is adapted to control the selecting movements of the member 23 through the connections above described, and in order to secure such control, the same is adapted to be supplied with fluid pressure from the remotely-positioned controlling device 13. The actuator 16, as shown in Fig. 2, includes a cylinder 32 housing the piston 31, and in order that the latter may be normally centered with respect to the cylinder, for the purpose of maintaining the shifting finger 23 in a neutral position, as shown in Fig. 1, a suitable precompressed resilient device such as a spring 33 is employed, the expansion of said spring in opposite directions being limited by means of cups 34 and 35. In assembling the parts of the actuator 16, the spring 33 is placed under a slight initial compression, and from this construction, it will be readily observed that the piston 31, and hence the shifting finger 23, is resiliently maintained in a central or neutral position when fluid pressure is exhausted from both ends of the cylinder 32.

The remotely-positioned manually-operable transmission control device 13 is located conveniently to the operator of the vehicle and is preferably constituted as disclosed in the application of Stephen Vorech, Serial No. 57,447, filed January 3, 1936 corresponding to Patent No. 2,075,917 dated April 6, 1937. Such device includes a plurality of valve mechanisms adapted to be selectively operated as by means of a manually-operable control lever 36, movements of which are suitably guided as by means of a slotted cover 37 on a casing 38. As shown, the cover 37 is provided with right-angularly intersecting slotted portions 39 and 40, but it will be readily understood that other suitable guiding slots may be provided in the cover for controlling the selection and establishment of a desired gear relation depending upon the particular vehicle transmission utilized. In the present arrangement, movement of the control lever 36 to the left and right in slot 40 establishes first and reverse gear relations respectively while movement of the control lever to the left and right in slot 39 establishes second and third gear relations respectively. Such movements of the control lever operate suitable control valves housed within the casing 38 for the purpose of providing fluid pressure for the actuators 16 and 17 from a reservoir 41, the latter being connected to the control unit by conduit 42.

In order to control the flow of fluid pressure to the selecting actuator 16 to effect selection of the desired shifter bar in accordance with controlling movements of the lever 36, opposite ends of the said actuator are connected to the unit 13 through conduits 43 and 44, the connections being made in such a manner that movement of the control lever 36 in the slot 40 to the left and right, as viewed in Fig. 1, will establish a flow of fluid through the conduits 44 and 43 respectively, such operation respectively effecting selection of shifter bar 18 or 20.

Associated with the selector actuator 16 is a valve mechanism for controlling the flow of fluid pressure to the shifting actuator 17 during certain desired shifting movements of the latter, such valve mechanism being employed for the purpose of insuring selection of the desired shifter bar before energization of the shifting actuator, as well as insuring neutralization of the gear relations between the establishment of successive gear ratios. Such valve mechanism employs three similar valve devices and, referring to Fig. 2, one of such devices will be referred to in detail. As shown therein, one such valve device 45 is constituted by an inlet connection 46, an outlet connection 47 and a ball valve 48, normally resiliently maintained, as by means of a spring 49, in such a position as to close off communication between the inlet and outlet. Actuating means for said ball valve in the nature of a plunger 50 operated through a ball 51 is provided for unseating the valve 48 to establish a connection between the inlet 46 and outlet 47 in response to movements of the selector actuator 16. As shown, the piston rod 30 of the latter is provided with a reduced extension 52 carrying a valve-actuating member 53 provided with a circular cam 54. This cam is so constituted, as will appear from Fig. 2, that the same will contact the ball 51 during downward movement of the piston 31 in order to actuate the valve 48. Fluid pressure may thus be conducted through the outlet 47 to a chamber 55 formed by the member 53, which chamber is in constant communication with the shifting actuator 17 through a conduit 56. As will appear from Figs. 2 and 3, in addition to the valve device 45, similar valve devices 57 and 58 are provided, the latter valve being actuated by the cam 54 when the parts are in the neutral position shown in Fig. 2, while valve devices 57 and 45 are not operated except when the piston 31 is moved up or down sufficiently to enable cam 54 to engage balls 51.

As will be readily perceived from Figs. 1, 2 and 3, the conduit 44 which supplies fluid pressure from the control unit to the selector actuator 16 is provided with a branch conduit 58a which supplies fluid pressure to the intake 46 of valve device 45. Similarly, the conduit 43 which supplies fluid pressure to the opposite end of the actuator 16 is provided with a branch conduit 59 for conducting fluid pressure to the inlet 46 of valve device 57. Valve device 58 is supplied with fluid pressure from the control device 13 directly through conduit 60.

From the above described construction, it will be readily understood that in the event the control lever 36 is moved to the left-hand extremity of slot 40, fluid pressure is conducted through conduit 44 to the upper end of actuator 16, as viewed in Fig. 2, and the piston 31 thereof will be moved downwardly in order to effect selection of the shifter bar 18 through the portion 21 of the shifter fork 10. Fluid under pressure will not be conducted, however, to the shifting actuator 17 until the aforesaid selection is made and the valve-actuating member 53 has moved to engage cam 54 with the valve device 45 and has unseated the valve 48 thereof. This latter operation will serve to connect conduits 44 and 56 through the branch conduit 58a and the chamber 55 in order to conduct fluid pressure to the right-hand portion of actuator 17, as viewed in Fig. 1. Movement of the control lever 36 to the right-hand extremity of slot 40 will, on the other hand, connect reservoir 41 to the conduit 43, and fluid under pressure will thus be conducted to the lower end of the actuator 16, as viewed in Fig. 2, in order to effect upward movement of the piston 31 and consequent selection of the shifter bar 20 through oscillation of the combined selector and shifter member 23.

Here again, however, fluid pressure will not be conducted to the shifting actuator 17 until the valve-actuating member 53 has moved sufficiently to open the valve 48 associated with valve device 57. When this latter operation occurs, it will be readily understood that conduits 43 and 56 will be connected through the branch conduit 59 and chamber 55. As above-stated, the aforesaid movements of the selector actuator, respectively selecting the shifter bars 18 and 20, are responsive to the movement of the control lever 36 to the left and right in slot 40. Upon subsequent operation of the shifting actuator 17, as will be more particularly pointed out hereinafter, shifting movements of the selected shifter bars 18 and 20 are effected in order to establish first or reverse gear relation without further operation of the control lever.

Figure 4:
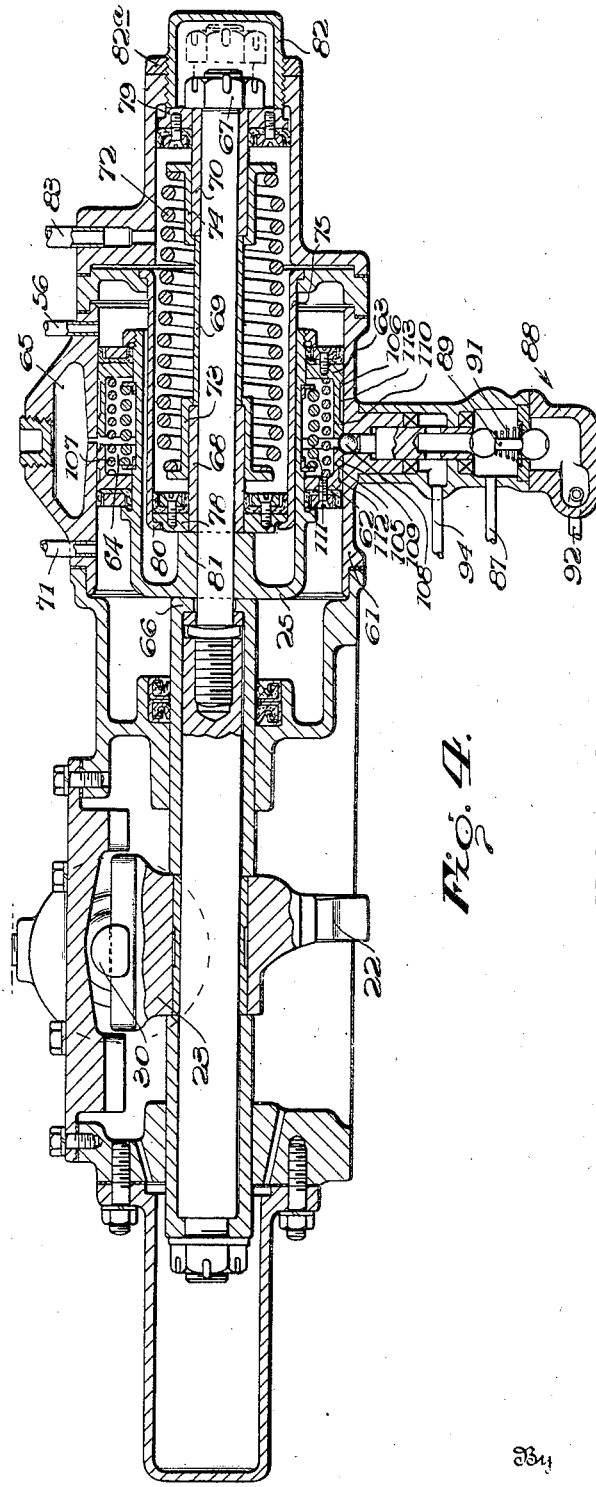
Fig. 4 is a longitudinal sectional view of the power-controlling mechanism illustrating the shifting power unit as well as the clutch-controlling valve mechanism operated thereby.

The shifting actuator 17, referring more particularly to Fig. 4, is constituted by a cylinder 61 housing the piston 25, which latter, in the form of the invention illustrated, is constituted by a pair of spaced-apart piston heads 62 and 63, the space 64 therebetween being adapted to be supplied with a suitable lubricant from a reservoir 65. The piston 25 is adapted to impart movement to the piston rod 24 in one direction through a sleeve 66 and in the other direction through a nut 67, there being interposed between the piston and the nut a plurality of sleeves 68, 69 and 70. In addition to the conduit 56 which communicates with the right-hand portion of the actuator 17, the latter is provided with a conduit connection 71 which is directly connected with the control unit 13 and is supplied with fluid pressure upon movement of the control lever 36 to the left-hand extremity of slot 39, this movement serving to establish second gear relation through movement of the piston 25 to the right, as viewed in Fig. 1. Third gear relation is established by supplying fluid pressure through conduit 56 to the right-hand portion of the shifting actuator 17.

Means are provided by the present invention for cushioning or retarding the movement of the shifter actuator at a time when the gear relation is about to be established, such construction avoiding the undue stresses and strains which might otherwise occur in establishing a gear ratio by means of power mechanism. In the form of the invention illustrated in Fig. 4, such means comprise a precompressed spring 72 which is confined between a pair of cups 73 and 74, the engagement between the latter and sleeves 68 and 70 serving to limit the expansive force of the spring 72. The latter is housed within a cylinder 75 containing pistons 78 and 79 which are respectively slidably mounted upon the sleeves 68 and 70. As illustrated, the piston 78 abuts a flange 80 of cylinder 75 as well as hub 81 of the piston 25, while piston 79 abuts the nut 67 and the inner end of a cap 82. The pistons 78 and 79 are normally maintained in this position as by means of fluid pressure conducted to the cylinder 75 directly from the reservoir 41 through a conduit 83, this construction forming not only a part of the cushioning means but also an advantageous structure for automatically neutralizing the gear relations.

It will readily appear from Fig. 4 and the foregoing description that fluid pressure conducted to the shifting actuator 17 through conduit 71 will effect a rapid movement of pistons 25 and 78 in unison until the cup 74 contacts piston 79. Continued movement of the piston 25 and piston 78 will continue but at a reduced rate due to the force required to compress the spring 72, it being appreciated that during this cushioning movement of the piston 25, sleeve 69 will move relatively to the cup 74. Upon release of fluid pressure from the actuator, the spring 72 will tend to rapidly return the parts to neutral position. This neutralization will be aided and completed by the fluid pressure within cylinder 75 which constantly tends to force the piston 78 to the end of said cylinder.

In assembling the elements constituting the above described structure, the cap 82 is utilized for the purpose of preventing any looseness or play in the piston assembly. For example, after all parts have been positioned within the cylinder 61, fluid pressure is conducted through conduit 83 to the cylinder 75 in order to move pistons 78 and 79 outwardly. The piston 79 will engage nut 67 under these conditions, and cap 82 is thereupon screwed inwardly until it makes contact with the piston 79. The cap is then locked in position by means of nut 82a. With this arrangement, any undesirable play between the piston 79 and the nut 67 is avoided.

In order to relieve the operator of the necessity of manual operation of the vehicle clutch during gear-shifting operation of the mechanism hereinbefore described, the present invention utilizes a construction to automatically control the vehicle clutch in such a manner that the same is completely disengaged prior to any movement of the shifting piston and selected shifter bar. The construction is also such that after establishment of the desired gear relation, the clutch is automatically permitted to engage, through the action of its associated return spring, in a gradual and efficient manner, such arrangement completely avoiding any necessity on the part of the operator for manually controlling the vehicle clutch. This arrangement is, moreover, so constituted that manual control of the vehicle clutch may be exercised as heretofore. To this end, see Figs. 1 and 4, the vehicle clutch-controlling member 14 is adapted to be actuated by means of the fluid pressure actuator 15 through connections 84, 85 and 86, said actuator being adapted to be supplied with fluid pressure through conduit 87 by means of a valve mechanism 88. The latter includes a combined inlet and exhaust valve member 89, mounted within a casing 90 and normally urged as by a spring 91 to close off communication between conduits 92 and 87. The casing 90 is provided with an exhaust chamber 93 which, in the present instance, is connected through a conduit 94 to a manually-operated clutch-controlling valve 95 for a purpose which will appear more fully hereinafter. Slidably mounted within the casing 90 is a valve-actuating element 96 which is formed with a hollow bore 97 communicating with the chamber 93 through ports 98. The lower end of the element 96 is formed as an exhaust valve seat 99 which is normally spaced from the valve 89 but which, upon downward movement, is adapted to engage said valve to close off communication between chamber 100 and chamber 93 and to establish communication between the chamber 100 and the conduit 92, thus effecting disengagement of the vehicle clutch.

Figure 5:
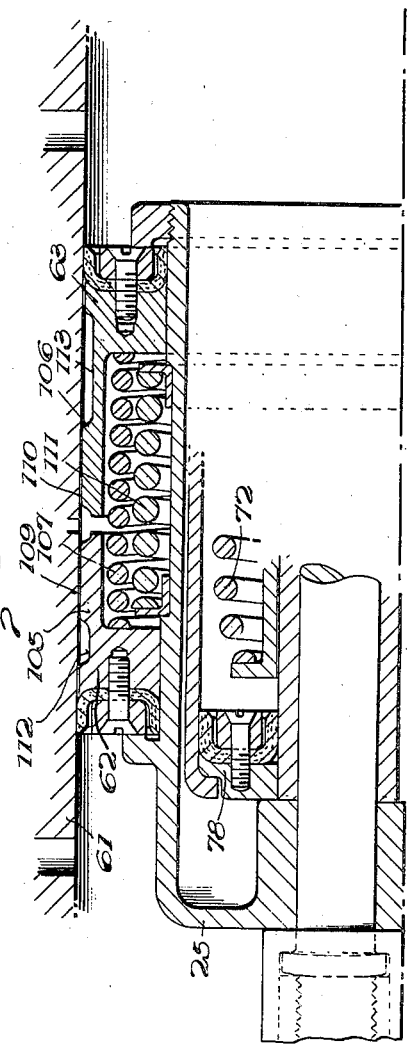
Fig. 5 is an enlarged axial sectional view of a portion of the shifting power unit.

Means are provided for effecting operation of the valve 88 in such a manner that fluid pressure is admitted to the clutch actuator 15 prior to shifting movement of the piston 25 and selected shifter bar connected thereto. This construction insures that the vehicle clutch shall be disengaged prior to the establishment or disestablishment of any gear ratio, the construction also being such that after a desired gear relation is established, or a neutralization of the gear relation is effected, the vehicle clutch is automatically permitted to engage by exhausting the valve 88. The structure provided for realizing the above advantages includes the pistons 62 and 63 which are provided with cam sections 105 and 106 respectively, the pistons and cam sections being normally held in spaced-apart position, as indicated in Figs. 4 and 5, as by means of a relatively light spring 107. In normal position, the adjacent ends of sections 105 and 106 are so positioned as to receive ball 108, thus permitting the valve 89 to be moved to closed position under the action of spring 91. Movement of either of the pistons 62 or 63 will, however, move the valve 89 to open position through cooperation of cams 109 and 110 formed on the sections 105 and 106. This initial movement of each of the said pistons is effected at a relatively low pressure. A precompressed spring 111 carried by the piston 25 is so positioned with respect to the pistons 62 and 63 as to be picked up by said pistons before cam sections 105 and 106 abut each other. This spring is precompressed to a degree sufficient to sustain the load necessary to move the gears after motion thereof has been started. Thus the cam sections 105 and 106 will abut each other momentarily during the initial operation and thereafter the force required to actually shift the gears will be transmitted through the spring 111.

When the gears reach engaged position, the fluid pressure which is built up within the cylinder 61 is slightly in excess of that required to overcome the force of friction and the force exerted by the neutralizing pistons 78 and 79. Thus at the end of the stroke of the shifter piston, the preloaded spring is compressed, thus allowing the two cam sections 105 and 106 to abut each other. These sections are provided with cams 112 and 113 which thereupon selectively become aligned with ball 108, depending upon the direction of movement of the shifter piston 25, and the valve mechanism 88 is returned to exhaust position in order to permit engaging movement of the clutch-controlling member 14. During a shift from one gear relation to another or return to neutral, the preloaded spring 111 will separate the cam sections 105 and 106 as soon as the pressure within the shifting actuator cylinder 61 is reduced. The separation of the cam sections will effect operation of the valve mechanism 88 to again supply fluid pressure to the clutch actuator 15 in order to disengage the vehicle clutch prior to shifting movement of the shifter piston 25. Upon return to neutral position and on exhausting of pressure from the cylinder 61, the cam sections 105 and 106 will fully separate in response to the expansion of spring 107.

During the automatic operation of the vehicle clutch-controlling member 14 when fluid pressure is initially conducted to the shifting actuator, it has heretofore been pointed out that the valve 88 exhausts the clutch actuator 15 directly through the manually-operable clutch-controlling valve 95 by way of conduit 94. Such manually-operable valve is provided with an operator-controlled pedal 140 and serves when operated to convey fluid pressure through the same line 94 to the clutch actuator 15 through valve 88, the fluid passing from reservoir 41 to the valve 95 through conduit 141. The last named valve, which may be constructed as disclosed in the patent to Lester A. Fowler No. 1,626,607, dated May 3, 1927, is provided with an atmospheric port 142 and the parts of the valve are so adjusted that this exhaust port is restricted when the valve 95 is in normal position. Such restriction permits a gradual exhausting of the fluid from the clutch actuator 15 when the automatically-operable valve 88 is actuated and this permits a gradual engagement of the clutch without the necessity of manual manipulation of the valve 95. The common conduit 94 for exhausting the valve 88 and for admitting fluid to the clutch actuator when valve 95 is actuated, dispenses with the necessity of providing separate actuators for the clutch-controlling member or providing a double-check valve arrangement.

In operation, assuming that the parts occupy the neutral position indicated on the drawings, movement of the control lever 36 to the left-hand extremity of slot 40 serves to admit fluid pressure from the reservoir 41 to the selector actuator 16 through conduits 42 and 44. Movement of the piston 31 in the actuator 16 responsive to the fluid pressure conducted thereto will effect oscillating movement of the selector finger 23 to cause the lower portion 22 thereof to select the shifter bar 18 through engagement of portion 22 with the slot 21 of the shifter fork 10. Simultaneously with the selection of bar 18, referring to Fig. 2, the valve 45 controlling the flow of fluid pressure to the shifting actuator 17 will be operated by the valve-actuating member 53 connected with the selector piston 31, and fluid pressure will be conducted through said valve to the right-hand portion of the shifting actuator 17 via chamber 55 and conduit 56, the fluid pressure so conducted being exerted against piston 25 in order to move piston rod 24, member 23 and shifter bar 18 to the left, as viewed in Fig. 1, to establish first gear relation. It will be noted, however, that in view of the fact that piston 63 operates the valve mechanism 88 before the said piston contacts the precompressed spring 111 carried by the piston 25, disengagement of the vehicle clutch will be insured prior to shifting movement of the piston 25.

As heretofore pointed out, checking or cushioning means is associated with the shifting actuator 17 in order to retard that portion of the movement of the actuator when a gear relation is about to be effected. The construction whereby this feature is secured has been heretofore described and includes the precompressed spring 72 which, when in contact with pistons 78 and 79, serves to retard or cushion the remaining portion of the stroke of either of said pistons. In the present instance, when it is assumed that first gear relation is being established, the spring 72 retards the gear-engaging movement of the piston 79.

Adjacent the limit of the stroke of the shifter piston 25 and after engagement of the selected transmission gears is effected, the piston 63 continues to move to the left, as viewed in Fig. 4, in response to the increase of pressure supplied to the cylinder 61. This pressure increase is sufficient to effect compression of the spring 111 and consequent alignment of the ball 108 with cam 113 of the cam section 106. When this occurs, valve mechanism 88 is exhausted through the manually-operable clutch-controlling valve 95 and the clutch-controlling member 14 is automatically permitted to be returned to engaged position in a smooth and graduated manner.

In the event that it is now desired to establish the second gear relation, the control lever 36 is returned to the neutral position indicated in Fig.

1 and promptly moved to the left-hand extremity of slot 39. As soon as the control lever 36 reaches the neutral position, however, the valve of the control device 13 controlling the first gear relation is exhausted to atmosphere through an exhaust conduit 143 common to all the valves and the control device 13. When this occurs, the selecting actuator 16 and the shifting actuator 17 are directly connected to exhaust and the neutralizing pistons 78 and 79 associated with the shifter piston promptly return the latter to neutral position. As soon as this occurs, the selector piston 31 is enabled to be centered through the action of the spring 33, it being understood that the centering of the selector piston prior to the neutralization of the shifting member 23 is prevented either by engagement of the portion 22 with the sides of the shifter forks or through any suitable guide means such as member 144 associated with the flanged portion 29 of the shifter member.

In returning to neutral position, it will be understood that the preloaded spring 111 moves cam portion 106 with respect to the portion 105 as soon as the pressure starts to reduce within the cylinder 61, thus operating the valve mechanism 88 and effecting disengagement of the vehicle clutch prior to disestablishment of the gear relation. When neutralizing is completed, the cam sections 105 and 106 will be again separated in order to effect exhaust movement of the valve 88 and consequent engagement of the vehicle clutch.

When the neutralizing operation above described has been completed and all of the parts including valve 45 controlled by the selector piston 31 have been returned to the position shown in the drawings, fluid pressure will be conducted directly to the left-hand portion of the shifter actuator 17 through conduit 71, this being due to the operation of the valve controlled by the movement of the control lever 36 to the second gear position. Fuid pressure being thus exerted against the shifter piston 25 will move the latter, shifter finger 23 and shifter bar 19 to the right, as viewed in Fig. 1, in order to establish second gear relation. Prior to initial movement of the shifter piston, the vehicle clutch will be disengaged as heretofore described and thereafter the gear relation established in a cushioned manner through the functioning of the cushioning spring 72.

Third gear relation is established by movement of the control lever to the right-hand extremity of slot 39, as viewed in Fig. 1, which causes shifting movement of the shifter bar, 19 to the left, as viewed in said figure. During establishment of the third gear relation, no movement of the selector piston 31 takes place and fluid pressure is conducted directly to the right-hand portion of the shifter actuator through the valve 58 maintained in open position by cam 54 when the selector piston is in central position.

Selection and establishment of reverse gear relation is effected through movement of the control lever 36 to the right-hand extremity of slot 40, such movement establishing sequential selection of the shifter bar 20 and shifting of the latter to the left, as viewed in Fig. 1. Fluid pressure under these conditions is conducted to the shifting actuator 17 through operation of valve 57 effected by movement of the selector piston 31 to the left, as viewed in said figure.

While one embodiment of the invention has been described herein with considerable particularity in connection with the accompanying drawings, it will be readily understood by those skilled in the art that alterations and changes of various kinds may be made without departing from the spirit of the invention. Reference will therefore be had to the appended claims for a definition of the limits of the invention.

What is claimed is:

1. In combination with a vehicle clutch-controlling member and a shiftable gear-changing element, a fluid motor for actuating said member, a fluid actuator including a piston for shifting said element, means for supplying actuating fluid to said actuator to shift said piston and element to establish a desired gear relation, and means directly operated by said piston for controlling the flow of actuating fluid to said motor.

2. In combination with a vehicle clutch-controlling member and a shiftable gear-changing element, a fluid motor for actuating said member, a fluid actuator including a piston for shifting said element, means including a lost motion connection for connecting said piston and element, means for supplying actuating fluid to said actuator to move said piston prior to shifting of said element, and means directly operated by said piston during its initial movement for controlling the flow of actuating fluid to said motor.

3. In combination with a vehicle clutch-controlling member and a shiftable gear-changing element, a fluid motor for actuating said member, a fluid actuator including a double-acting piston for shifting said element in either of opposite directions, means for normally maintaining said piston in neutral position, means for supplying actuating fluid to said actuator to move said piston in either of opposite directions from said neutral position, and means directly operated by said piston during its initial movement in either direction for admitting actuating fluid to said motor.

4. In combination with a vehicle clutch-controlling member and a shiftable gear-changing element, a fluid motor for actuating said member, a fluid actuator including a double-acting piston for shifting said element in either of opposite directions, means including a lost motion connection for connecting said piston and element, means for normally maintaining said piston in neutral position, means for supplying actuating fluid to said actuator to move said piston in either of opposite directions from said neutral position to take up the lost motion in said connection and then move said element, and means directly operated by said piston during its initial movement in either direction for admitting actuating fluid to said motor.

5. In combination with a vehicle clutch-controlling member and a shiftable gear-changing element, a fluid motor for actuating said member, a fluid actuator including a double-acting piston for shifting said element in either of opposite directions, means including fluid pressure-operated pistons coacting with said double-acting piston for normally maintaining the latter in neutral position, means for supplying energizing fluid to said actuater to move said piston in either of opposite directions from said neutral position, and means directly operated by said piston during its initial movement in either direction for admitting energizing fluid to said motor.

6. In combination with a vehicle clutch-controlling member and a shiftable gear-changing element, a fluid motor for actuating said member, a fluid actuator including a double-acting piston for shifting said element in either of opposite directions, said double-acting piston being formed with a pair of separate piston sections each of which is constructed and arranged to have a slight movement independently of the other, means for normally maintaining said piston in neutral position, means for supplying fluid pressure to said actuator to move said piston in either direction, and means responsive to movement of one piston section with respect to the other for supplying fluid pressure to said motor.

7. In a vehicle-controlling mechanism having a clutch-controlling member and a gear-shifting element, power means for operating said member, power means including a pair of piston sections for operating said element, said sections being relatively movable with respect to each other, means for admitting a power medium to said second power means, and means controlled by said sections during relative movement therebetween for admitting a power medium to said first power means.

8. In combination with a vehicle clutch-controlling member and a shiftable gear-changing element, a fluid motor for actuating said member, a fluid actuator including a double-acting piston for shifting said element in either of opposite directions, means for normally maintaining said piston in neutral position, means for supplying actuating fluid to said actuator to move said piston in either of opposite directions from said neutral position, means for controlling the application of fluid to said motor, and cam mechanism on said piston for operating said controlling means during initial movement of said piston in either direction.

9. In a power-gear-shifting mechanism having a member shiftable to establish a desired gear relation, a fluid motor including a cylinder, a piston in said cylinder and having a pair of piston sections mounted for limited movement with respect to each other, valve-operating means formed on said sections, valve means operated by said first named means during movement of one piston section with respect to the other, and means for yieldingly opposing relative movement of one section with respect to the other.

10. In a vehicle control mechanism having a control member and a gear-shifting element, fluid means for operating said member, fluid means including a piston for shifting said element, valvular means for admitting fluid to said second named fluid means, valvular means for admitting fluid to said first named fluid means, and means formed on said piston to operate said second named valvular means upon initial movement of said piston.

11. In combination with a vehicle clutch-controlling member and a shiftable gear-changing element, a fluid motor for actuating said member, a fluid actuator including a piston for shifting said element, means for supplying fluid to said motor, and means for conducting fluid to said actuator; said piston being operable in response to the fluid supplied said actuator to sequentially open said supplying means, move said shiftable element to establish a desired gear relation, and thereafter close and exhaust said supplying means.

12. In a gear-shifting device having a member shiftable to establish different gear relations, and a single fluid motor for shifting said member comprising a cylinder, a piston rod, a piston operatively connected with said rod, a pair of neutralizing pistons associated with said rod for moving the latter and piston to neutral position, and a cap adjustably received within one end of said cylinder and engaging one of said neutralizing pistons when said first named piston is in neutral position.

THOMAS J. TUREK.